United States Patent [19]

Ino

[11] Patent Number: 4,529,249
[45] Date of Patent: Jul. 16, 1985

[54] PASSIVE RESTRAINT FOR VEHICLE SEAT

[75] Inventor: Kenji Ino, Akishima, Japan

[73] Assignee: Tachikawa Spring Co., Ltd., Japan

[21] Appl. No.: 616,892

[22] Filed: Jun. 4, 1984

[51] Int. Cl.³ .................. A47C 31/00; B60R 21/00
[52] U.S. Cl. ................................. 297/474; 280/802;
297/469
[58] Field of Search .............. 297/469, 475, 474, 483;
280/801, 802, 807, 808

[56] References Cited

U.S. PATENT DOCUMENTS

| | | | |
|---|---|---|---|
| 2,488,858 | 11/1949 | Franz | 297/475 |
| 3,897,082 | 7/1975 | Takada | 280/802 |
| 4,235,456 | 11/1980 | Shakespear | 280/807 |
| 4,343,488 | 8/1982 | Stephenson | 280/802 |
| 4,436,323 | 3/1984 | Yamamoto | 297/469 |

Primary Examiner—James T. McCall
Attorney, Agent, or Firm—Cushman, Darby & Cushman

[57] ABSTRACT

A passive restraint using a seat belt is disclosed which serves to secure the safety of an occupant in a vehicle seat. In this passive restraint, a front frame section of a cushion frame of the seat is formed with a recessed portion, a belt retractor is fitted into and fixed to this recessed portion, and a belt guide is provided in the rear portion of one of side frame sections of the cushion frame which continues from a corner portion where the recessed portion is formed, whereby the seat belt that is guided from the belt retractor is extended along the outer surface of the above-mentioned one side frame section, inserted through the belt guide, and then turned over upwardly of a seat cushion of the vehicle seat.

7 Claims, 9 Drawing Figures 4,529,249

PASSIVE RESTRAINT FOR VEHICLE SEAT

BACKGROUND OF THE INVENTION

1. Field of the Invention

The present invention relates to an improved seat-belt-type passive restraint for a vehicle seat which is so designed as to be able to secure the safety of an occupant when shocks are given to the occupant due to the collision of the vehicle or the like.

2. Description of the Prior Art

Conventionally, a passive restraint of this type is constructed such that a belt retractor is mounted on the side of a vehicle body. In such passive restraint, when an occupant adjusts the position of his or her seat while the occupant is restrained, his or her belt wearing attitude is changed. Thus, it is necessary to adjust the length of a seat belt each time the position of the seat is adjusted. Also, when a seat belt of a relatively larger length is employed, the seat belt itself may be stretched, resulting in the deterioration of the restraint performance of such passive restraint for its wearer when a collision occurs.

In view of these circumstances, many improved passive restraints have been proposed in which a belt retractor is mounted on the side of a seat, i.e., within a cushion frame so that even when the occupant adjusts the position of the seat while he or she is restrained the restraining condition of the seat belt will never be altered.

In such passive restraint of the last-mentioned type, however, there are still some problems which arise when the retractor is mounted within the cushion frame. Specifically, if the belt retractor is located on the lower surface side of a sitting portion of the seat or in the lower portion of the cushion frame which is opposed to an input portion for the seat belt, the belt retractor may be abutted against the lower surface of a seat pad forming the sitting portion of the seat, or the seat belt runs across and is abutted against the lower surface of the seat pad. This gives the occupant a strange feeling while seated and also provides an obstacle to the correct operation of the seat belt. Also, the seat belt itself is brought into direct contact with the cushion frame so that it may be contaminated or broken. Further, since it is necessary to form a bore for insertion of the seat belt in the cushion frame, the strength of the cushion frame is decreased accordingly. Such decreased strength must be compensated by some reinforcement means and this reinforcement means results in the increased weight of the cushion frame itself.

In addition, when assembling such passive restraint, after the belt retractor is fixed to the cushion frame, the seat belt must be guided out externally by means of the insertion bore formed in the side surface of the cushion frame and, in particular, it is difficult to insert through the bore a large-sized buckle mounted at the free end of the seat belt. In other words, such passive restraint is disadvantageous in that it takes much time and labor in assembling.

SUMMARY OF THE INVENTION

In view of the above-mentioned situations, the present invention aims at eliminating the drawbacks found in the above-mentioned prior art devices.

Accordingly, it is a first object of the invention to provide an improved passive restraint in which a belt retractor and a belt guide can be mounted in a simple manner.

In attaining this object, according to the invention, a belt retractor and a belt guide are installed respectively on the front surface side of a seat cushion and on the side surface side of the same so that a seat belt is allowed to travel from the front surface side of the seat cushion along the side surface side thereof. As a result of this, the belt retractor and belt guide can be installed very simply after the seat cushion is assembled.

It is a second object of the invention to provide a passive restraint in which a seat belt will not be made dirty or broken. For this purpose, the seat belt of the invention is arranged such that it will not be brought into direct contact with a cushion frame.

It is another object of the invention to provide a passive restraint in which the strength of a cushion frame may not be impaired and thus the cushion frame need not be reinforced.

In order to accomplish this object, according to the invention, a belt retractor is fitted into and fixed to a recess formed in the outside of the cushion frame. In other words, the cushion frame is formed of a channel steel or a Z-steel into a part of which the belt retractor is fitted and fixed.

It is still another object of the invention to provide a passive restraint in which the sitting comfortableness of a seat cushion may not be impaired. To this end, according to the invention, a seat belt and a belt retractor are provided in the outside of a cushion frame. Also, since the seat belt is arranged so as to run along the outer periphery of the cushion frame, it is sure that the seat belt can be operated smoothly.

Many other features, advantages and additional objects of the present invention will become manifest to those versed in the art upon making reference to the detailed description which follows and the accompanying sheet of drawings.

DETAILED DESCRIPTION OF PREFERRED EMBODIMENTS OF THE INVENTION

Figure 1:
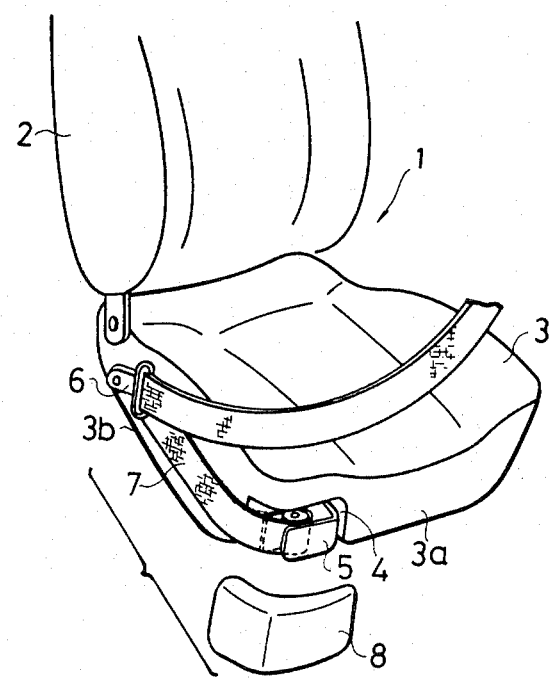
FIG. 1 is a perspective view of a vehicle seat provided with a passive restraint constructed in accordance with the present invention.
Figure 2:
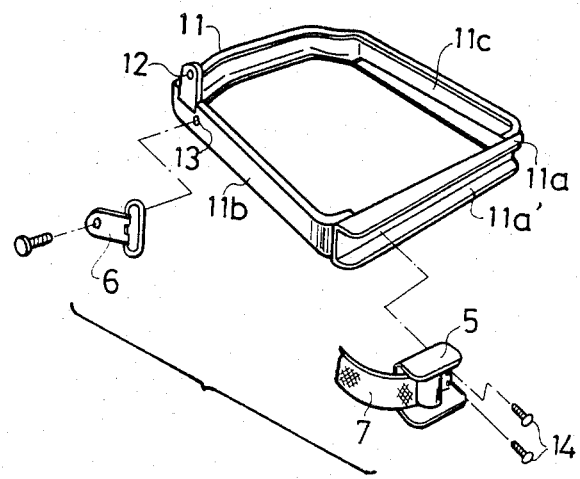
FIG. 2 is a perspective view of a cushion frame of the same seat, illustrating how to mount a belt retractor and a belt guide to the cushion frame.

FIGS. 1 and 2 illustrate a first embodiment of the invention. In FIG. 1, reference numeral (1) designates an entire vehicle seat, (2) represents a seat back of the seat, and (3) denotes a seat cushion thereof. The seat cushion (3) has a recess (4) formed in one of corners on the side of its front surface portion (3a), into which recess (4) is fixedly fitted a belt retractor (5). A belt guide (6) is mounted to the rear portion of one side surface portion (3b) which continues from the corner where the recess (4) is formed. A seat belt (7) that is guided out from the belt retractor (5) is inserted through this belt guide (6) and is then turned over upwardly of the seat cushion (3). Also, a resin cover (8) is provided on the front surface side of such recess (4) so as to cover the belt retractor (5).

In FIG. 2, there is illustrated a cushion frame that is employed in the first embodiment of the invention and is designated by numeral (11). This cushion frame (11) is formed of a channel-steel into a quadrilateral configuration and also includes a front side frame section (11a) which is fixed between the tip ends of its two side frame sections (11b) and (11c) with its opening (11a') being faced forwardly. A top member is placed over the cushion frame in a manner to cover the whole cushion frame except one end portion of the top member, i.e., the very portion that corresponds to the recess (4) in the seat cushion (3), so that the recess (4) is formed or revealed after placement of the top member.

In the rear portion of the side frame section (11b) is formed a mounting bore (13) for mounting the belt guide (6), which bore (13) is located adjacent to a mounting portion for a free hinge bracket (12). The belt retractor (5) is fitted into one end of the opening (11a') of the front frame section (11a) or the very portion that corresponds to the recess (4) and is fixed by bolts (14). Also, the belt guide (6) is mounted into the mounting bore (13) formed in the rear portion of the side frame section (11b) by means of bolts (15). Such mounting of these belt retractor (5) and belt guide (6) is carried out after the assembly of the seat cushion (3) has been completed. Finally, the resin cover (8) is mounted such that it covers the belt retractor (5).

Figures 3A, 3B:
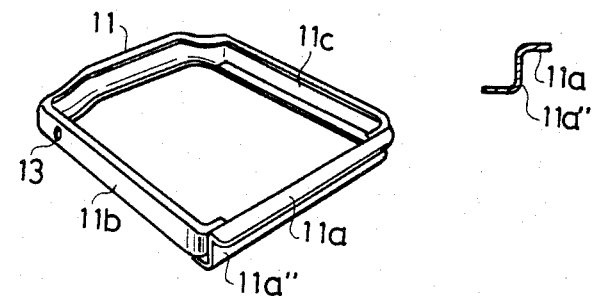
FIG. 3A is a perspective view of a modification of the cushion frame shown in FIG. 2.
FIG. 3B is an enlarged section view of a portion of the modification shown in FIG. 3A.
Figures 4A, 4B:
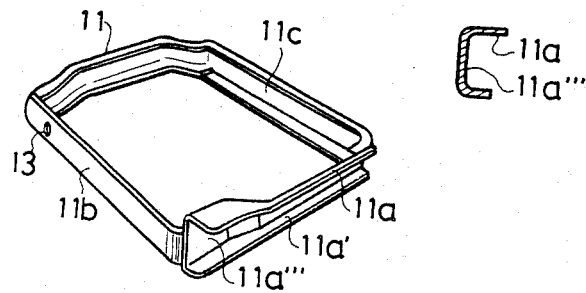
FIG. 4A is a perspective view of another modification of the cushion frame.
FIG. 4B is a section view of main portions of the modification shown in FIG. 4A.

FIGS. 3 and 4 respectively illustrate modifications of the cushion frame (11) in the above-mentioned first embodiment of the invention. Specifically, the cushion frame (11) in FIG. 3 includes a front side frame section (11a), which is formed of a Z-steel and is fixed between the tip ends of two lateral side frame sections (11b)(11c) in such a manner that its upper frame portion (11a'') is projected forwardly. The belt retractor (5) is fixed to one end portion of this Z-steel front frame section (11a).

The cushion frame (11) shown in FIG. 4, which comprises a front frame section (11a) formed of a channel-steel as in the cushion frame shown in FIG. 2, is formed by expanding one end portion of the opening (11a') of the front frame section (11a) or a portion (11a''') corresponding to the recess (4). This cushion frame can be conveniently used to mount a large size belt retractor (5) thereto. It should be noted that such large-width opening (11a''') may be formed not only at the end portion of the front frame section (11a) but also at any optional positions suitable for mounting the belt retractor such as the central position of the front frame section.

We will not explain here the manner to mount the belt retractor (5) and belt guide (6) to the respective cushion frames (11) shown in FIGS. 3 and 4, since they can be mounted to the respective cushion frame in the same manner as with the above-mentioned embodiment in FIG. 2.

Figure 5:
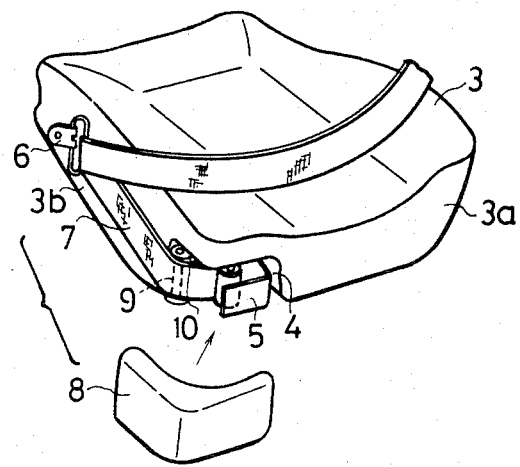
FIG. 5 is a perspective view of a cushion part of an alternate vehicle seat incorporating the passive restraint of the invention.
Figure 6:
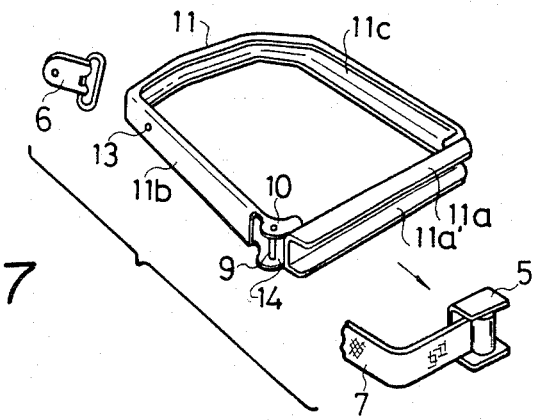
FIG. 6 is a perspective view of a cushion frame of the alternate embodiment, illustrating how to mount a belt retractor and a belt guide to this cushion frame; and, FIG. 7 is a perspective view of an alternate embodiment of the cushion frame shown in FIG. 6.

Now, FIGS. 5 and 6 illustrate a second embodiment of the invention in which the belt retractor (5) can be mounted at any suitable positions in the seat cushion (3) other than at its best position in the front surface portion of the seat cushion, that is, its corner portion as in the above-mentioned first embodiment of the invention. For example, in this second embodiment, the belt retractor can be located in the central portion of the seat cushion (3).

In other words, in this embodiment, the recess (4) is formed at any optional position in the front frame section of the seat cushion and a guide pin (9) is mounted to a portion adjacent to one of corner portions of the seat cushion, whereby the seat belt (7) that is guided out from the belt retractor (5) is caused to change its direction around the guide pin (9) and is then inserted through the belt guide (6). Although in this embodiment again the belt retractor (5) is covered with a resin cover (8), this resin cover (8) is formed slightly longer at its side surface sides than that shown in FIG. 1 so that it can cover the guide pin (9) as well.

FIG. 6 illustrates a cushion frame (11) employed in the second embodiment of the invention, which is made of a channel-steel into a quadrilateral configuration as with that shown in FIG. 2. Thus, this cushion frame (11) has a front frame section (11a) fixed between the tip ends of its two side frame sections (11b) and (11c) in such a manner that the opening (11a') of the front frame section (11a) is faced forwardly. Also, the side frame section (11b) of this cushion frame (11) is provided at its forward end corner portion with a bracket portion (10) for insertion of the above-mentioned guide pin (9) as well as is formed in its rear portion with a mounting bore (13) for mounting the belt guide (6).

Figure 7:
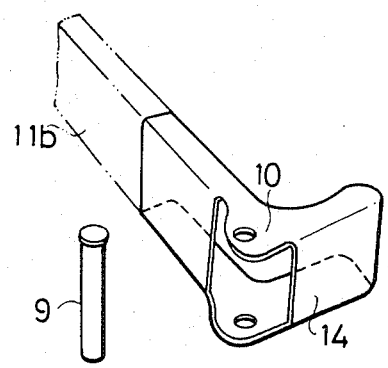

The bracket (10) for the guide pin (9) may be formed integrally with the side frame section (11b), or, alternatively, as shown in FIG. 7, a separate member or a bent member (14) having an L-shaped configuration is fixedly mounted to the forward end portion of the side frame section (11b), and thereafter a bracket (10) may be provided at the corner portion of this bent member (14) in an integral manner.

Also, the front frame section (11a) may be formed in such configurations as shown in FIGS. 3 and 4. Especially, as shown in FIG. 4, the front frame section that is formed in a portion thereof with the wide opening (11a''') is suitable for this embodiment.

In this second embodiment, the belt retractor (5) and belt guide (6) are to be mounted to the cushion frame (11) in the same manner as mentioned above, and, therefore, any further description as to their mounting manner will not be required here.

What is claimed is:

1. A passive restraint for use with a vehicle seat, comprising a recessed portion provided in the outside of a front frame section of a cushion frame of said seat, a belt retractor fitted into and fixed to said recessed portion, a belt guide provided in the rear portion of one of side frame sections of said cushion frame, and a seat belt so arranged that it is guided from said belt retractor, runs along the outer surface of said one side frame section, is inserted through said belt guide, and is then turned over upwardly of a seat cushion of said vehicle seat.

2. The passive restraint as set forth in claim 1, wherein said recessed portion is provided in one of corner portions or in the central portion of said front frame section.

3. The passive restraint as set forth in claim 1, wherein a resin cover is mounted to said recessed portion so as to cover said belt retractor.

4. The passive restraint as set forth in claim 1, wherein said front frame section of said cushion frame is formed of a channel- or Z-steel.

5. The passive restraint as set forth in claim 1, wherein said recessed portion is formed by expanding out a part of a steel having a channel-shaped section.

6. The passive restraint as set forth in claim 1, wherein said recessed portion is formed in any of optional portions of said front frame section and a guide pin is provided adjacently to one of corner portions of said cushion frame.

7. The passive restraint as set forth in claim 6, wherein said guide pin is mounted to a bracket provided in said one side frame section integrally therewith or separately therefrom.

* * * * *